US012247675B2

(12) United States Patent
Nishimura et al.

(10) Patent No.: US 12,247,675 B2
(45) Date of Patent: Mar. 11, 2025

(54) THERMOSTAT DEVICE

(71) Applicant: NIPPON THERMOSTAT CO., LTD., Kiyose (JP)

(72) Inventors: Tetsuya Nishimura, Kiyose (JP); Masayuki Numata, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/270,082

(22) PCT Filed: Nov. 11, 2021

(86) PCT No.: PCT/JP2021/041518
§ 371 (c)(1),
(2) Date: Jun. 28, 2023

(87) PCT Pub. No.: WO2022/163068
PCT Pub. Date: Aug. 4, 2022

(65) Prior Publication Data
US 2024/0068588 A1    Feb. 29, 2024

(30) Foreign Application Priority Data
Jan. 28, 2021 (JP) .................................. 2021-012284

(51) Int. Cl.
*F01P 7/16* (2006.01)
*F16K 31/00* (2006.01)
(Continued)

(52) U.S. Cl.
CPC ...... *F16K 31/002* (2013.01); *F01P 2007/146* (2013.01); *F01P 7/16* (2013.01); *F16K 2200/30* (2021.08); *G05D 23/022* (2013.01)

(58) Field of Classification Search
CPC ...... F01P 7/16; F01P 2007/146; G05D 23/02; G05D 23/021; G05D 23/022;
(Continued)

(56) References Cited

U.S. PATENT DOCUMENTS 4,978,060 A * 12/1990 Stahly .................. G05D 23/022
                                                        236/34.5
5,381,953 A *  1/1995 Fishman .................. F01P 11/16
                                                        236/DIG. 2
(Continued)

FOREIGN PATENT DOCUMENTS

EP      2565505 A1   3/2013
EP      1754869 B1   4/2017
(Continued)

OTHER PUBLICATIONS

PCT/ISA/210, "International Search Report for PCT International Application No. PCT/JP2021/041518," Feb. 1, 2022.
(Continued)

*Primary Examiner* — Craig J Price
(74) *Attorney, Agent, or Firm* — HAUPTMAN HAM, LLP

(57) ABSTRACT

The thermostat device includes a housing having a valve seat formed thereinside, a thermo-element having one end inserted inside the housing, a valve body seated on or separated from the valve seat by the extension/contraction of the thermo-element, a coil spring biasing the valve body toward the valve seat, and a frame supporting one end of the coil spring. The housing has a hollow body part opening at one end, paired legs erecting from the opening edge of the body part, on whose leading ends the frame is hooked, and ribs provided at the opening edge and contiguous to each root side of the legs. The outer surface of each leg is arc-shaped, and the outer surface of each rib is curved or inclined to extend from the outer surface of the correspond-
(Continued)

ing leg toward the inner side of a circle connecting the outer surfaces of the pair of legs.

4 Claims, 5 Drawing Sheets

(51) Int. Cl.
*F01P 7/14* (2006.01)
*G05D 23/02* (2006.01)

(58) Field of Classification Search
CPC .. G05D 23/121; G05D 23/123; G05D 23/185; G05D 23/1852; G05D 23/1856; F16K 31/002; F16K 27/0254; F16K 2200/30–3053; Y10T 137/1963; Y10T 137/1987; Y10T 137/7737; Y10T 137/7724; Y10T 137/7837; Y10T 137/8326
USPC .............. 137/468, 457, 79, 80, 511, 557; 236/92 C, 92 D, DIG. 2, 34, 34.5, 93 R
See application file for complete search history.

(56) References Cited

U.S. PATENT DOCUMENTS

| | | | |
|---|---|---|---|
| 6,592,046 B2 * | 7/2003 | Suda | F01P 7/167 236/34.5 |
| 6,761,321 B2 * | 7/2004 | Takahashi | F01P 7/16 236/34.5 |
| 6,966,278 B2 * | 11/2005 | Takahashi | G05D 23/1333 123/41.1 |
| 7,721,974 B2 * | 5/2010 | Inoue | G05D 23/022 123/41.08 |
| 8,186,604 B2 * | 5/2012 | Park | F01P 7/16 236/34.5 |
| 8,646,417 B2 * | 2/2014 | Watanabe | G05D 23/022 123/41.1 |
| 9,052,030 B2 * | 6/2015 | Suda | F16K 31/025 |
| 9,464,727 B2 * | 10/2016 | Kusakabe | F01P 7/16 |
| 9,777,617 B2 * | 10/2017 | Nakajima | F01P 7/167 |
| 10,443,482 B2 * | 10/2019 | Shimomura | F01P 7/16 |
| 10,767,547 B2 * | 9/2020 | Inoue | G05D 23/1852 |
| 11,377,999 B2 * | 7/2022 | Nishimura | F16K 27/02 |
| 11,965,454 B2 * | 4/2024 | Nishimura | F01P 7/16 |
| 11,982,220 B2 * | 5/2024 | Yajima | F16K 27/003 |
| 12,025,049 B2 * | 7/2024 | Nishimura | G05D 23/022 |
| 2006/0163373 A1 | 7/2006 | Inoue | |
| 2011/0233287 A1 * | 9/2011 | Park | G05D 23/1333 236/34.5 |
| 2012/0319028 A1 | 12/2012 | Kusakabe | |
| 2016/0356203 A1 | 12/2016 | Kusakabe | |
| 2017/0074155 A1 | 3/2017 | Shimomura | |

FOREIGN PATENT DOCUMENTS

| | | |
|---|---|---|
| EP | 3163047 A1 | 5/2017 |
| JP | 2005-155831 A | 6/2005 |
| JP | 2006-329272 A | 12/2006 |
| JP | 2016-008568 A | 1/2016 |
| JP | 2018-025269 A | 2/2018 |

OTHER PUBLICATIONS

Extended European Search Report for European Application No. 21923073.7 dated Dec. 4, 2024; 7 pp.

* cited by examiner

THERMOSTAT DEVICE

RELATED APPLICATIONS

The present application is National Phase of International Application No. PCT/JP2021/041518 filed Nov. 11, 2021, and claims priority from Japanese Application No. 2021-012284, filed Jan. 28, 2021, the disclosure of which is hereby incorporated by reference herein in its entirety.

TECHNICAL FIELD

The present invention relates to thermostat devices.

BACKGROUND FIELD

Among thermostat devices, as disclosed in Patent Document 1 (see FIG. 5), for example, there is a thermostat device that includes a hollow housing 60, a thermo-element 51 having one end inserted into the housing 60 and extending and contracting in response to temperature, a valve element 52 that opens or closes by expansion or contraction of the thermo-element 51, a coil spring 53 for biasing the valve body 52 in a closing direction, and a frame 65 for supporting one end of the coil spring 53, the frame 65 being hooked to the tips of the pair of legs 62, 62 of the housing 60.

CITATION LIST

PTL 1: JP-A-2005-155831

SUMMARY OF INVENTION

Technical Problem

In a thermostat device, as shown in FIG. 5, where a frame 65 acting as a spring receiver at the tip of the leg 62 of the housing 60 is hooked, the spring load of the coil spring 53 acts on the legs 62. Even in such cases, if the housing 60 is made of a metal, such as aluminum, there is no problem with the durability of the legs 62.

However, for the purpose of cost reduction, weight reduction, etc., if the housing 60 including a pair of legs 62, 62 is changed as it is from metal to synthetic resin, the durability is reduced, and the spring load causes the tips of the pair of legs 62, 62 to move away from each other and deform to open the pair of legs 62, 62 and may cause the frame 65 to fall off.

As a method of inhibiting the opening of the pair of legs 62, 62, increasing the thickness, width, or length of the legs or providing reinforcing ribs outside the pair of legs 62, 62 can be employed, but in such a case, the large legs 62 or ribs for reinforcement may interfere with a counterpart member, which fails to mount the thermostat device thereon.

Specifically, for example, if the thermostat device is disposed on the inlet side of the engine in the automobile, the thermostat device is attached to a water pump that supplies coolant to the engine. In this case, the member on the water pump side for mounting the thermostat device is the counterpart member, and a mounting hole into which the legs of the thermostat device and the thermo-elements inside the thermostat device are inserted is formed to the counterpart member. The mounting hole size may not be freely changed in some cases. As mentioned above, if the leg 62 of the thermostat device is enlarged or if a reinforcing rib is provided on the outside of leg 62, there may be a risk of being unable to insert in the mounting hole of the mating member.

That is, enlarging the leg 62 of the thermostat or providing a reinforcing rib on the outside of the leg 62 without changing the mounting hole of the counterpart member may cause a risk to arise that the seal line of the gasket that is located on the outside of the leg 62 to seal between the housing of the thermostat device and the counterpart member cannot be achieved, which may cause a risk of failing to ensure an attaching space for gaskets.

It is an object of the present invention to provide a thermostat device capable of suppressing the opening of the legs of the housing and also suppressing a decrease in mountability.

Solution to Problem

In order to solve the above-described problem, a thermostat device according to the present invention comprises
a housing in which a valve seat is formed therein;
a thermo-element having one end disposed inside the housing and performing a telescopic operation in response to temperature;
a valve body provided on an outer periphery of the thermo-element and being seated on and separated from the valve seat by the telescopic operation of the thermo-element;
a biasing member biasing the valve toward the valve seat; and a frame supporting one end of the biasing member,
wherein the housing includes a hollow body portion having an opening at one end and having the valve seat formed thereinside,
a pair of legs, standing up from an opening edge of the body, hooked on the frame at the tip end; and
ribs provided at the opening edge and contiguous with both sides of the root of the leg,
wherein the outer surface of the leg is formed in an arc shape when viewed from the tip side of the leg, and the outer surface of the rib is curved or inclined so as to extend from the outer side surface of the leg toward the inside of an imaginary circle connecting the outer side surfaces of the pair of legs.

According to such a configuration, since the outer side surfaces of the ribs connected to both root sides of the pair of legs are curved or inclined so as to be directed toward the inside of the imaginary circle connecting the outer surfaces of the pair of legs, the durability can be improved with respect to the force applied in the direction of opening (separating) the tips of the pair of legs. Also, since the ribs do not extend beyond the imaginary circle connecting the outer side surfaces of the pair of legs to the outside and are located inside the imaginary circle, and when the thermostat device is mounted on the counterpart member, the ribs do not interfere with the counterpart member, and the mountability can be improved.

Further, the seal line of the gasket sealing between the housing and the counterpart member passes outside the leg, but the seal line can be positioned inwardly in portions other than the outside of the legs. Thus, the housing can be compact, and the thermostat device can be reduced in weight and installation space.

In the thermostat device, the radius of curvature of the outer side surface of the rib may be set smaller than the radius of curvature of the outer side surface of the leg. In this way, the amount of protrusion toward the inside of the rib can be suppressed while securing the length of the rib.

Further, since the corners (edges) can be prevented from being formed at the boundary between the outer side surface of the leg and the outer side surface of the rib, the concentration of stress at the corners can be prevented. Thus, according to the above configuration, it is more advantageous to increase the durability of the legs.

In the thermostat device, a concave recessed portion may be formed on the inner side surface of the ribs. Since this structure allows to reduce the amount of protrusion inward the ribs and uniformizes the width of the ribs as possible, molding accuracy can be increased when the housing is injection-mold with synthetic resin material.

Advantageous Effects of Invention

According to the present invention, the thermostat device allows for the inhibiting opening of the legs of the housing and prevents lowering of the mountability.

DESCRIPTION OF EMBODIMENTS

Figure 1:
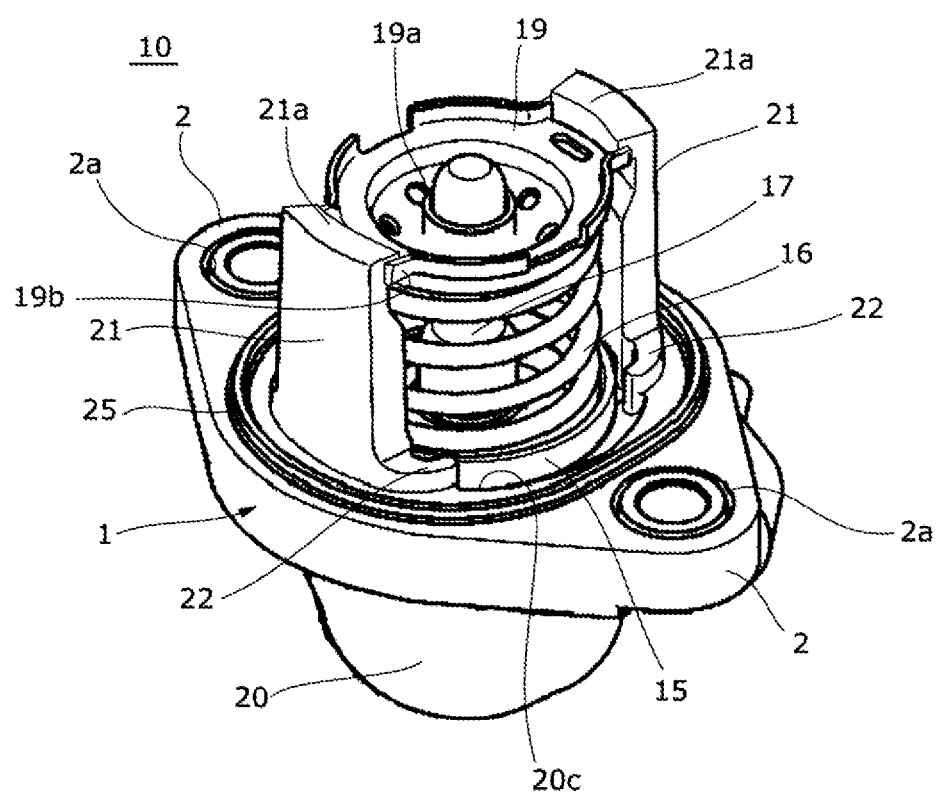
FIG. 1 is a perspective view of an embodiment of the thermostat according to the present invention viewed from the tip end side.
Figure 2:
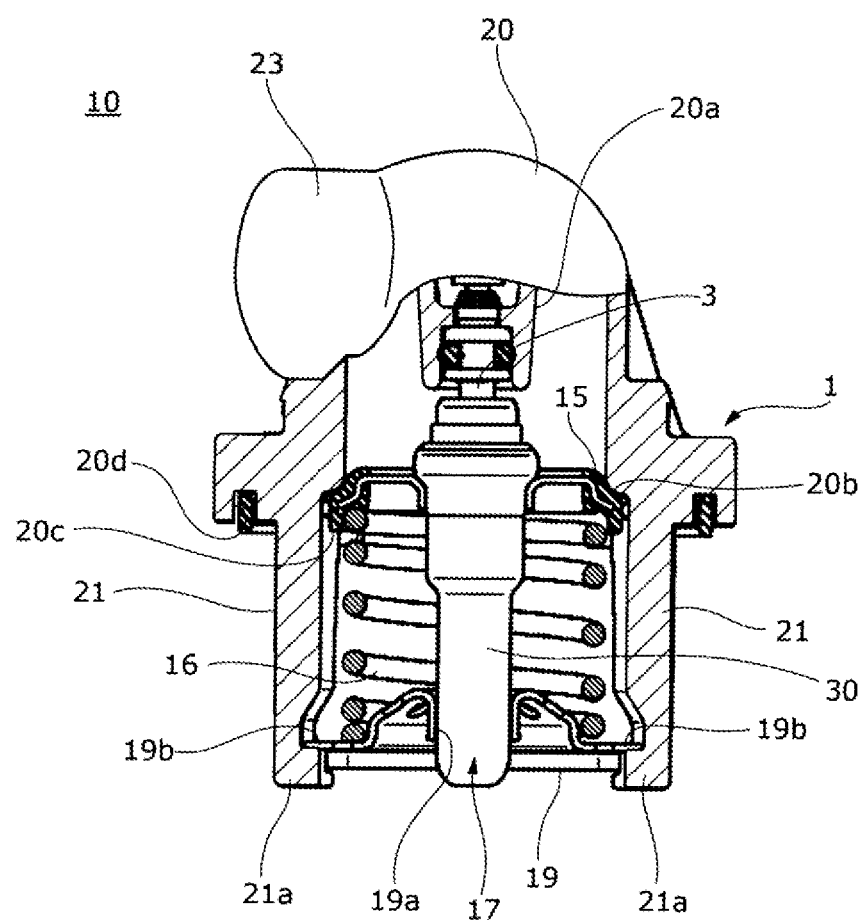
FIG. 2 is a partial cross-sectional view of an embodiment of the thermostat according to the present invention.
Figure 3:
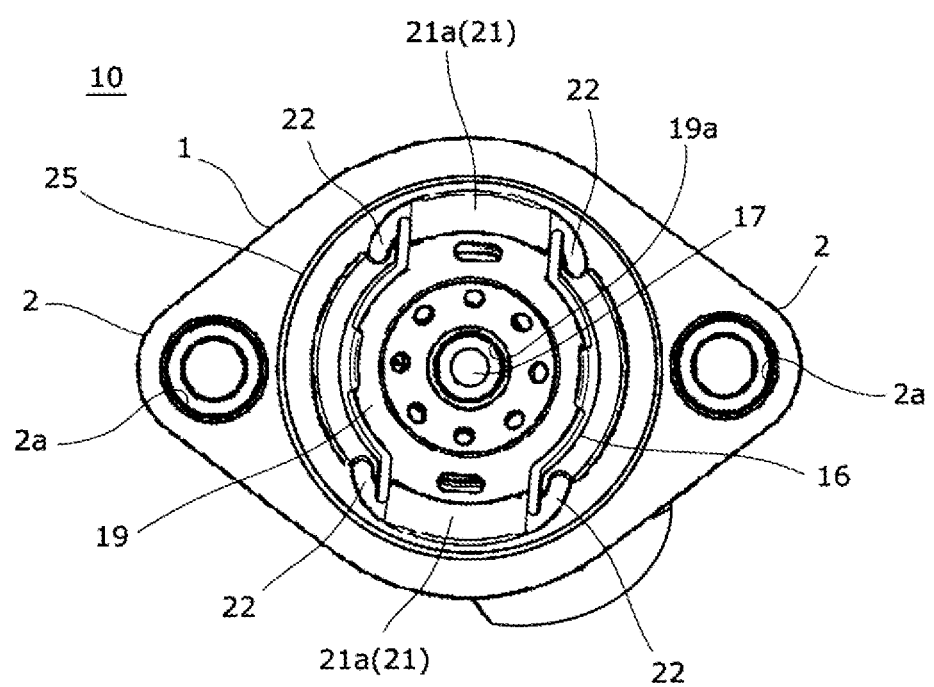
FIG. 3 is a bottom view of an embodiment of the thermostat according to the present invention.

An embodiment of the thermostat according to the present invention will be described with reference to the drawings below. The thermostat device 10 according to the present invention shown in FIGS. 1 to 3 is installed in a coolant system of an engine, for example. Specifically, the thermostat device 10 is installed at the inlet-side or outlet-side of the engine of a cooling path connecting a radiator and the engine and controls the coolant temperature circulating through the engine by opening or closing the cooling path depending on the temperature of the coolant.

As shown in FIG. 2, the thermostat device 10 includes a hollow housing 1, a thermo-element 17 one end of which is inserted in the housing 1, a valve body 15 provided on the outer periphery of the thermo-element 17, which opens and closes the cooling path, a coil spring 16 as a biasing member which biases the valve body 15 toward the closing direction, and a frame 19 which support one end of the coil spring 16. For the convenience of description, the upper and lower portions of the thermostat device 10 shown in FIG. 2 are simply referred to as "the upper" and "the lower."

In the present embodiment, the housing 1 is formed of synthetic resin. The housing 1 includes a body 20 having a capped nearly-cylinder shape formed with an opening 20c at the lower end, a pair of legs 21, 21 extending downward facing each other from the edge of the opening at the lower end of the body 20, a radiator-side connecting portion 23 disposed at the top of the body 20, and a pair of flanges 2, 2 protruding outward from the lower end outer periphery of the body 20. The coolant passes through the connection portion 23, the inside of the body 20, and the opening 20c, these of which compose a part of the cooling path.

The pair of flanges 2, 2 have a bolt hole 2a each. The bolt hole 2a has a metal sleeve press-inserted (not shown), and through which a bolt is inserted (not shown) with which the thermostat device 10 is fixed to the counterpart member. An annular groove 20d is formed to surround the opening 20c at the edge of the lower end opening of the body 20 that is located inward the bolt holes 2a, and a gasket 25 is mounted on the groove 20d.

The gasket seals between the thermostat device 1 and the counterpart member preventing the coolant flowing in the housing 1 from leaking outward when the thermostat device is mounted. The inside of the housing 1 denotes the inside (inner portion) of the gasket 25 in the body 20.

An annular-shape valve seat 20b is formed on the inner periphery just above the edge of the lower opening of the body 20 located inside the housing 1, and the coolant path is opened and closed whereby the valve body 15 unseats from or seats on the valve seat 20b.

A thermo-element 17 is inserted into the housing 1. The thermo-element 17 is disposed on the axial portion of the body 1 to align with the axial line. The thermo-element 17 includes an element case 30 in which a thermal expansion body such as wax is sealed, and a piston 3 inserted in the element case 30 retractably.

When the temperature of the coolant around the element case 30 rises and the thermal expansion body inside expands, the piston 3 retracts from the element case 30 and thermo-element 17 elongates. In contrast, when the temperature of the coolant around the element case 30 lowers and the thermal expansion body inside contracts, the piston 3 enters the element case 30 and the thermo-element 17 contracts. Thus, the thermo-element elongates and contracts, depending on the temperature.

The tip end of the piston 3 located at the top end of the thermo-element 17 fits a tubular boss 20a formed at the inner top portion of the body 20. This causes to prevent the movement upward of the piston 3 against the housing 1. The elongation and contraction of the thermo-element 17 cause the element case 30 to move downward or upward, without changing the position of the piston 3 against the housing 1.

The valve body 15 is fixed to the outer periphery of the element case 30. The valve body 15 moves upward or downward along with the elongation and contraction of the thermo-element 17. When the valve body 15 moves downward due to the extension of the thermo-element 17, because the valve body 15 is unseated from the valve seat 20b to allow the coolant to pass therebetween, the communication of the coolant path is allowed. When the valve body 15 moves upward to seat in the valve seat 20b due to the contraction of the thermo-element 17, the communication of the coolant path is closed. Thus, the valve body 15 opens or closes the coolant path by seating on or unseating from the valve seat 20b.

The upper end of the coil spring 16 abuts the backside of the valve 15. The coil spring 16 is disposed as to surround the periphery of the thermo-element 17. The lower end (one end) of the coil spring 16 is supported by the frame 19.

The frame 19 is hooked on the tip end of the pair of legs 21, 21 formed on the housing 1, and the movement downward against the housing 1 is inhibited. A through hole 19a is formed at the center of the frame 19. The element case 30 is movably inserted through the through hole 19a upward and downward. This means that the element case 30 is movable upward and downward against the frame 19.

The coil spring 16 is a compression spring and is disposed between the valve body 15 and the frame 19 in a compressed state. The valve body 15 is biased upward (to the valve seat 20b side) by the coil spring 16. In this configuration, when the temperature of the coolant around the thermo-element 17 rises high and the thermo-element 17 extends, the valve body 15 moves downward against the biasing force of the coil spring 16 and is unseated from the valve seat 20b. When the temperature of the coolant around the thermo-element 17 becomes low and the thermo-element 17 contracts, the valve body 15 moves upward by the biasing force of the coil spring 16 to approach the valve seat 20b.

As shown in FIG. 1, the housing 1 includes a pair of legs 21, 21, and ribs 22 for reinforcing disposed at the foot of each leg. Hooking portions 21a are each formed at the tip of the pair of legs 21, 21, and engaging portions 19b formed on the frame 19 are hooked on the hooking portions 21a.

Figure 4:
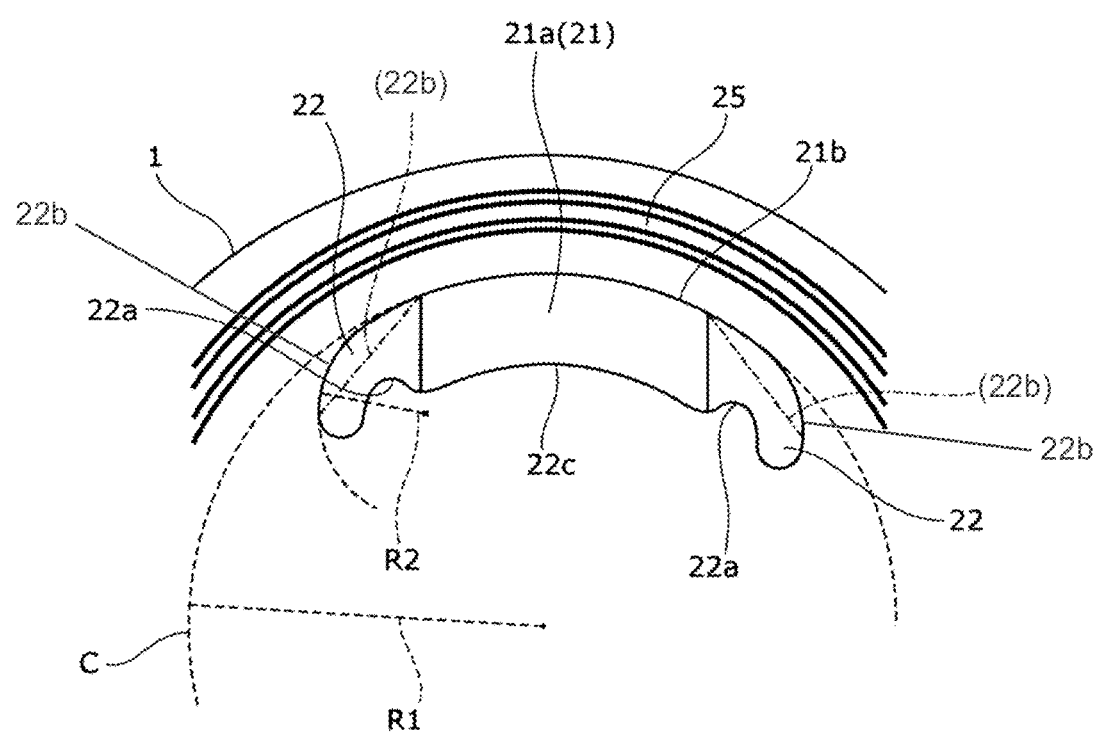
FIG. 4 is an enlarged view of a portion of the housing of the thermostat device shown in FIG. 3.
Figure 5:
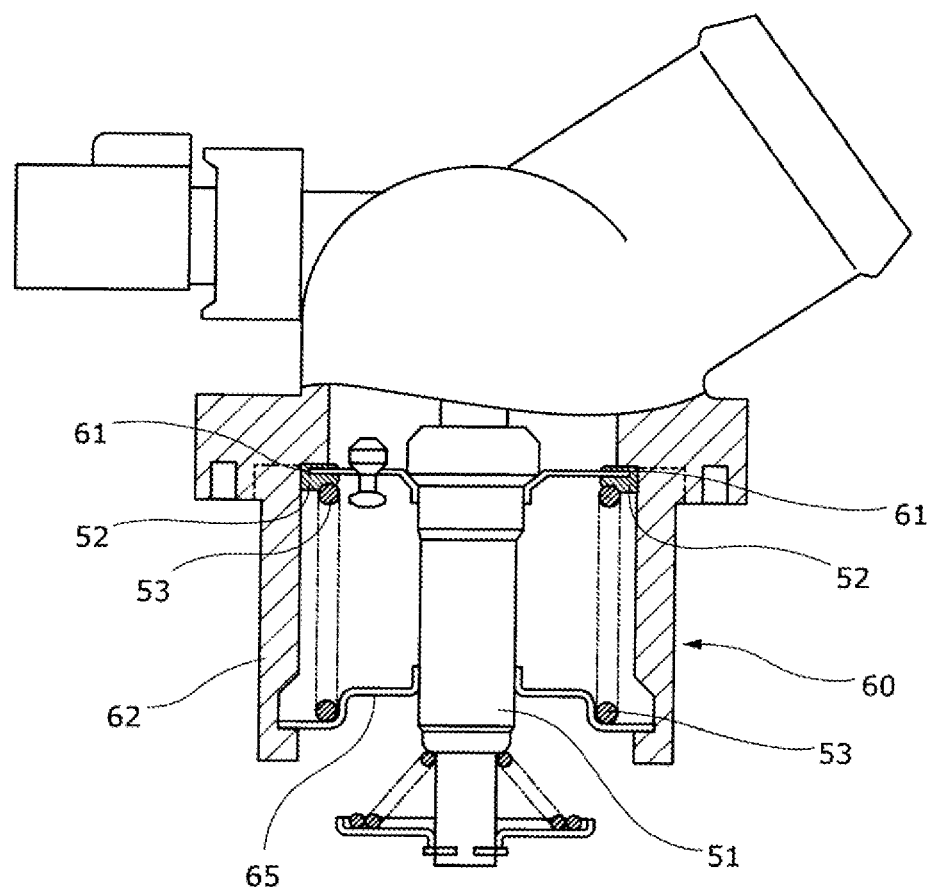
FIG. 5 is a partial cross-sectional view of a conventional thermostat device.

At each part constituting the housing 1, the inside denotes the center side of the body 20, and the opposite side is the outside (outer periphery side, or departing from the center). As shown in FIG. 4, the outer side surface 21b of the leg 21 is curved as an arc along the edge of the opening 20c when each leg 21 is viewed from the bottom side (the tip end side). A circle connecting the outer side surface of the pair of legs 21, 21 denotes a circle C. Ribs 22 are formed at the foot of each leg 21 as extending from both side surfaces at the foot of the leg 21.

The outer side surface 22b of each rib 22 is connected to the outer side surface 21b of the leg 21 and curves inward to the circle C from the outer side surface 21b of the leg 21. This allows for improving the durability against the force applied to the direction to open (separate) the tip ends of the pair of legs 21, 21. Thus, opening the legs 21 of the housing 1 can be suppressed.

In particular, when the thermostat device 10 is disposed at the inlet side of the engine, and the coolant passing through the radiator flows in from the connecting port 23, since the setting load of the coil spring 16 should be large such that the valve body 15 be not opened by the pressure of the coolant at the connecting port side, the force acting to open the legs 21 becomes large. Thus, applying the present invention to the thermostat device 10 disposed at the inlet side of the engine is particularly effective. The present invention may be applied to the thermostat device at the outlet side of the engine.

According to the above configuration, since the entire ribs 22 are disposed inwardly from the circle C, when the thermostat device 10 is mounted on the counterpart member, the ribs 22 do not interfere with the counterpart member. This configuration can suppress the lowering of the mountability of the thermostat device 10 even if the ribs 22 for reinforcing are provided.

Moreover, the seal line of the gasket sealing between the housing 1 and the counterpart member passes outside the leg 21, but the seal line can be positioned inwardly in portions other than the outside of the legs 21. Thus, the housing can be compact, and the thermostat device can be reduced in weight and installation space.

In the present embodiment, the outer side surface 21b of the rib 22 is curved, but not limited to. As recited by a dashed line in FIG. 4, the outer side surface 22b of the rib 22 may be inclined to direct toward the inside of circle C from the outer side surface 21b of the leg 21. Even in such a case, the opening of the legs 21 of the housing 1 can be suppressed, and the reduction in mountability of the thermostat device 10 can be suppressed, similar to the present embodiment.

In the thermostat device 10 in the present embodiment, the outer side surface 22b of the rib 22 is curved, and the radius of curvature R2 of the outer side surface 22b is smaller than the radius of curvature R1 of the outer side surface 21b of the leg 21 (R2<R1). Since according to the above configuration, the inward protruding amount of the rib 22 can be limited while ensuring the length of the rib 22, the forming the rib 22 to direct inward to the circle C does not require design alteration of valve 15 or others located inside the rib 22.

Further, since according to the above configuration, the outer side surface 21b of the leg 21 and the outer side surface 22b of the rib 22 can be curvedly connected, and the formation of corners (edges) between the outer side surface 21b of the leg 21 and the outer side surface 22b of the rib 22 can be prevented, the concentration of stresses in the corner is inhibited. The above configuration is more advantageous in improving the durability of the legs 22.

However, when the outer side surface 22b of the ribs 22 is curved, the radius of curvature R2 may be equal to or larger than the radius of curvature R1 of the outer side surface 21b of the legs 21 and can be appropriately modified.

A concave-shaped recess 22a is formed on the inner side surface 22c of the rib 22. More in detail, the inner side surface 22c of the rib 22 is contiguous with the inner side surface 21c of the leg 21 and curves outward from the inner side surface 21c of the leg 21 to form a recess 22a. According to this configuration, since the width of the rib 22 can be made as uniform as possible while suppressing the amount of protrusion to the inside of the rib 22, the molding accuracy can be increased when the housing 1 is injection molded with a synthetic resin.

The recess 22a may not be formed on the inner side surface 22c of the rib 22, and the material and the forming method of the housing 1 can be appropriately altered. Specifically, the housing 1 may be made of metal. The height (thickness), width, and length of the rib 22 can be appropriately altered according to the conditions of the load or durability.

The preferable embodiment of the present invention is described in detail above; modifications, transformations, and alterations are possible as far as departing from the scope of the claims.

REFERENCE SIGN LIST

1 Housing:
2 flange
3 piston
10 thermostat device
15 valve body
16 coil spring (biasing member)
19 frame
19b engaging portion
20 body
20a boss
20b valve seat
20c opening
21 leg
21a hooking portion
21b outer side surface of the leg
22 rib
22a recess
22b outer side surface of the rib
C a circle connecting the outer side surfaces of a pair of legs
R1 radius of curvature of the outer side surface of the leg
R2 radius of curvature of the outer side surface of the rib

The invention claimed is:

1. A thermostat device, comprising, a housing inside which a valve seat is formed;

a thermo-element having one end inserted inside the housing and performing an expanding/contracting operation in response to a temperature;

a valve body provided on an outer periphery of the thermo-element and being seated on and separated from the valve seat by the expanding/contracting operation of the thermo-element;

a spring biasing the valve body toward the valve seat; and a frame supporting one end of the spring, wherein the housing comprises a hollow body having an opening at one end and having the valve seat formed therein, a pair of legs standing up from an opening edge of the hollow body, the pair of legs on which the frame is hooked, and ribs provided at the opening edge and contiguous with both sides of a root of one leg of the pair of legs, wherein an outer side surface of the pair of legs is formed in an arc shape when viewed from a tip side of said one leg, and an outer surface of a rib of the ribs is curved or inclined so as to extend from the outer side surface of said one leg toward an inside of a circle connecting the outer side surface of the pair of legs.

2. The thermostat device of claim 1, wherein a radius of curvature of the outer side surface of the rib is smaller than a radius of curvature of the outer side surface of said one leg.

3. The thermostat device of claim 1, wherein a concave recess is formed on an inner side surface of the rib.

4. The thermostat device of claim 2, wherein a concave recess is formed on an inner side surface of the rib.

* * * * *